United States Patent [19]

Jackson, Jr. et al.

[11] Patent Number: 5,006,628
[45] Date of Patent: Apr. 9, 1991

[54] MELT PHASE POLYARYLATE PROCESS

[75] Inventors: Winston J. Jackson, Jr., Kingsport, Tenn.; W. Ronald Darnell, Weber City, Va.; Bruce C. Bell; Marc A. Strand, both of Kingsport, Tenn.

[73] Assignee: Eastman Kodak Company, Rochester, N.Y.

[21] Appl. No.: 567,483

[22] Filed: Aug. 15, 1990

[51] Int. Cl.$^5$ .............................................. C08G 63/02
[52] U.S. Cl. ................................. 528/182; 528/176; 528/179; 528/194
[58] Field of Search ................ 528/176, 194, 179, 182

[56] References Cited

U.S. PATENT DOCUMENTS 4,485,230  11/1984  Yu ..................................... 528/125

OTHER PUBLICATIONS

Macromolecules 1989, 22, 1065–1074.

Primary Examiner—Harold D. Anderson
Assistant Examiner—T. Mosley
Attorney, Agent, or Firm—Charles R. Martin; William P. Heath, Jr.

[57] ABSTRACT

A process for preparing a polyarylate by heating in the melt phase in the presence of a 4-dialkylaminopyridine, an acid anhydride which is in the range of stoichiometric amount to 25% molar excess, bisphenol-A and a dicarboxylic acid selected from the group consisting of isophthalic acid and mixtures of isophthalic acid and terephthalic acid wherein the ratio of isophthalic acid to terephthalic acid is in the range of 100:0 to 25:75.

4 Claims, No Drawings

MELT PHASE POLYARYLATE PROCESS

This invention relates to a melt phase process for preparation of a polyarylate.

Many processes have been reported in the literature for preparation of polyarylates. For example, it is well known that polyarylates can be prepared by preparing an admixture of an anhydride, a bisphenol and a dicarboxylic acid and then heating the admixture. Initially the anhydride reacts with the bisphenol to form the diester of the phenol and the diester subsequently polymerizes with the dicarboxylic acid in the melt to form a low molecular weight polymer. The low molecular polymer can then be solid phased to build up the molecular weight of the polymer to the desired level.

Preparation of a specific polyarylate using a preformed diester and 4-dimethylaminopyridine is disclosed in *Macromolecules* 1989, 22, 1065–1074.

U.S. Pat. No. 4,485,230 discloses a process for preparing polyarylates in the melt by heating a bisphenol, an aromatic dicarboxylic acid and acetic anhydride.

This invention is an improvement of the processes of the prior art. The improvement consists of three aspects. First, the process is a melt phase process wherein the diester and dicarboxylic acid polymerize into a useful high molecular weight polymer in the melt phase without the necessity of first preparing the low molecular weight polymer and then building up the molecular weight of the polymer by solid phase techniques. Second, a 4-dialkylaminopyridine is used as a catalyst. Lastly, the amount of anhydride is within the range of a stoichiometric amount to not more than 25% molar excess. The combination of these three aspects results in an unobvious combination of faster reaction time and better color.

By the term "better color" we mean that there is less yellow discoloration of the polymer. The absence of yellowness can be quantitatively expressed in terms of Yellowness Index wherein a lower value of Yellowness Index means that the polymer has less yellow discoloration.

Broadly, the process of this invention can be described as a process of preparing a polyarylate comprising heating in the melt phase a 4-dialkylaminopyridine, an acid anhydride which is prepared from an aliphatic carboxylic acid which contains from 2 to 6 carbon atoms and is in the range of a stoichiometric amount to 25% mole excess, bisphenol-A and a dicarboxylic acid selected from the group consisting of isophthalic acid and mixtures of isophthalic acid and terephthalic acid.

The 4-dialkylaminopyridine functions as a catalyst. The alkyl group can be straight chain or branched and can contain from 1 to 7 carbon atoms, or the two alkyl groups can be connected together to give a cycloaliphatic group. Methyl and ethyl are preferred with methyl being most preferred. The amount of the catalyst is not critical but can vary from 0.01 to 1.0 mol % with from 0.07 to 0.2 mol % being preferred.

The acid anhydride useful in this invention is derived from an aliphatic carboxylic acid which contains from 2 to 6 carbon atoms. Examples include acetic anhydride, propionic anhydride, butyric anhydride, pentanoic anhydride and the like. Propionic anhydride is most preferred because it results in preparation of a polyarylate having the best color.

The amount of anhydride which may be used in the process of the invention may vary from a stoichiometric amount to 25% molar excess, but less than 10 and preferably less than 5% molar excess is preferred in order to obtain a polyarylate having the best color.

The dicarboxylic acid useful in this invention is either isophthalic acid or a mixture of isophthalic acid and terephthalic acid. When a mixture of isophthalic acid and terephthalic acid is used the ratio of isophthalic acid to terephthalic acid is in the range of 100:0 to 25:75.

The bisphenol useful in this invention is 2,2-bis(4-hydroxyphenyl)propane, typically called bisphenol-A.

The 4-dialkylaminopyridine, acid anhydride, bisphenol-A and dicarboxylic acid can be reacted to form the polyarylate in accordance with procedures well known in the art using one or more conventional reaction vessels. Typically, the polyarylate is prepared in one reaction vessel by adding the acid anhydride, bisphenol, dicarboxylic acid and catalyst to the reaction vessel and reacting these materials to form the diester derivative of the dihydric phenol and then subsequently reacting the diester and dicarboxylic acid to form the polymer.

The polymerization reaction is conducted for a period of time sufficient to produce a polyarylate having an inherent viscosity of at least about 0.3. The reaction time is generally in the range of from about 2 hours to about 6 hours.

In accordance with procedures well known in the art, the pressure during the polymerization phase is reduced as the molecular weight of the polymer builds. Typically during the fluid stage of polymerization the pressure will be less than 5 torr and preferably less than 1 torr.

The 4-dialkylaminopyridine, acid anhydride, bisphenol-A and dicarboxylic acid are heated in the melt phase at a temperature in the range of 130° C. to 380° C. preferably 140° to 350° and more preferably 140° to 320°.

The inherent viscosity of the polyarylates prepared by the process of this invention is determined at 25° C. using 0.50 g/100 mL of a mixture of 60 volumes of phenol and 40 volumes of 1,1,2,2,-tetrachloroethane. The inherent viscosity is at least 0.3, preferably 0.5 and more preferably 0.6 or greater.

The polyarylates prepared by the process of this invention are useful as injection-molding plastics, films, and in blends with other polymers, such as polycarbonates and polyesters.

In the following examples the process of this invention is used to prepare a polyarylate, and films of the polyarylate are prepared by pressing a few grams of the dry polyarylate between two chrome-coated metal plates at 320° C. to 350° C. for 30 seconds. Film toughness is assessed by hand creasing the pressed films. Yellowness Index values are calculated from the visible spectra of solutions of 0.50 g of polymer in 25 mL of $CH_2Cl_2$/trifluoroacetic acid (70/30) in accordance with ASTM D1925.

A 1000-mL, single-necked flask is equipped with a stainless steel stirrer, provisions for maintaining a nitrogen atmosphere and applying vacuum, and an outlet leading to a cold trap. To the flask are then added 125.40 g (0.55 mole) bisphenol A, 91.30 g (0.55 mole) of isophthalic acid, and 0.067 g (0.00055 mole) of 4-dimethylaminopyridine catalyst. The flask is then evacuated and bled to nitrogen three times, and the calculated amount of acetic or propionic anhydride is added with a large, dry syringe. The flask is stirred with heating in a metal bath to 135° C. for 30 minutes, to 165° C. for 30 minutes, and finally to the specified build up temperature and held for 15-20 minutes. Vacuum is then applied during 10 minutes to <0.5 torr and continued for the indicated buildup time to obtain high melt viscosity. Melt-pressed films of all of the polyarylates are very tough. The color, amount of anhydride used and the time to inherent viscosity buildup are shown below.

| Ex. No. | Anhydride Used | Excess Anydr. Used, Mole % | Buildup Temp., °C. | Buildup Time, Min | I.V. | Yellowness Index |
|---|---|---|---|---|---|---|
| 1 | Acetic | 100 | 320 | 40 | 0.52 | 193 |
| 2 | Acetic | 50 | 320 | 15 | 0.43 | 112 |
| 3 | Acetic | 25 | 320 | 15 | 0.42 | 95 |
| 4 | Acetic | 15 | 320 | 10 | 0.43 | 67 |
| 5 | Acetic | 5 | 320 | 15 | 0.46 | 34 |
| 6 | Acetic | 5 | 330 | 30 | 0.53 | 65 |
| 7 | Acetic | 5 | 340 | 30 | 0.48 | 81 |
| 8 | Acetic | 5 | 350 | 15 | 0.54 | 93 |
| 9 | Propionic | 100 | 320 | 40 | 0.40 | 185 |
| 10 | Propionic | 50 | 320 | 30 | 0.45 | 56 |
| 11 | Propionic | 25 | 320 | 15 | 0.48 | 29 |
| 12 | Propionic | 15 | 320 | 30 | 0.44 | 24 |
| 13 | Propionic | 10 | 320 | 20 | 0.47 | 16 |
| 14 | Propionic | 5 | 320 | 18 | 0.51 | 18 |
| 15 | Propionic | 5 | 330 | 25 | 0.53 | 17 |
| 16 | Propionic | 5 | 340 | 15 | 0.55 | 34 |
| 17 | Propionic | 5 | 350 | 15 | 0.57 | 45 |

The following examples are comparative examples and illustrate (a) the poor results obtained when an attempt is made to carry out the polymerization without catalyst using the same heating schedule used in Examples 1-17 and (b) a typical, relatively long polymerization schedule which is required to attain a high molecular weight polymer when no catalyst is utilized.

18. Example 5 is repeated as regards the heating schedule except no 4-dimethylaminopyridine is added as a catalyst. The buildup time is 30 minutes, the I.V. is 0.32, and the pressed film is very brittle. Also, an appreciable amount of solid material is evident in the top of the flask and the system outlet.

19. Example 5 is again repeated except no 4-dimethylaminopyridine is added as a catalyst and the heating schedule is an follows: 135° C. for 3 hours plus 265° C. for 30 minutes plus 320° C. for 15 minutes. Vacuum is then applied as described in Examples 1-17, and the polyarylate is built up at <0.5 torr for 25 minutes to a high melt viscosity at 320° C. The I.V. of the polyarylate is 0.49, the yellowness index is 31, and a melt-pressed film is tough.

The following examples illustrate the unobvious effect of the use of 4-dimethylaminopyridine catalyst and propionic anhydride in the process of the invention (buildup temperature—350° C.).

| Ex. No. | DMAP Mole % | Excess Anhydr. Used, Mole % | Buildup Time, Min | I.V. | Yellowness Index |
|---|---|---|---|---|---|
| 20 | none | 5.0 | 15 | 0.53 | 55 |
| 21 | none | 10.0 | 15 | 0.62 | 100 |
| 22 | 0.10 | 5.0 | 20 | 0.60 | 52 |
| 23 | 0.10 | 10.0 | 15 | 0.54 | 55 |

The following example illustrates the utility of the new process of the invention for preparing a copolyester of terephthalic/isophthalic acids and bisphenol A having excellent color.

24. Example 14 is repeated except the materials charged to the polymerization flask are as follows:
125.40 g (0.55 mole) Bisphenol A
45.65 g (0.275 mole) Isophthalic acid
45.65 g (0.275 mole) Terephthalic acid
150.15 g (1.155 mole) (5% excess) Propionic anhydride
0.067 g (0.00055 mole) (0.1 moles%) 4-Dimethylaminopyridine The copolyester has an I.V. of 0.50, gives a very tough melt-pressed film, and has an ASTM Yellowness Index of 13.

The following example illustrates the utility of the process of the invention for the preparation of a copolyester containing low color even when prepared at a relatively high temperature (360° C.).

25. Example 14 is repeated except the final buildup temperature under vacuum is 360° C., the buildup time under vacuum is 15 minutes, and the materials charged to the polymerization flask are as follows:
125,40 g (0.55 mole) Bisphenol A
63.91 g (0.385 mole) Terephthalic acid
27.39 g (0.165 mole) Isophthalic acid
150.15 g (1.155 mole) (5% excess) Propionic anhydride
0.067 g (0.00055 mole)(0.1 mole%) 4-Dimethylaminopyridine The copolyester has an I.V. of 0.55, gives a very tough melt-pressed film, and has an ASTM Yellowness Index of 56.

We claim:

1. A process for preparing a polyarylate having an inherent viscosity of at least about 0.3 measured at 25° C. using 0.50 g/100 mL of a mixture of 60 volumes of phenol and 40 volumes of 1,1,2,2-tetrachloroethane comprising heating at a temperature in the range of 130° C. to 380° C. in the melt phase a 4-dialkylaminopyridine, an acid anhydride which is derived from an aliphatic carboxylic acid which contains from 2 to 6 carbon atoms and is in the range of a stoichiometric amount to 25% molar excess, bisphenol-A and a dicarboxylic acid selected from the group consisting of isophthalic acid and mixtures of isophthalic acid and terephthalic acid wherein the ratio of isophthalic acid to terephthalic acid is in the range of 100:0 to 25:75.

2. The process of claim 1 wherein the acid anhydride is propionic anhydride.

3. The process of claim 1 wherein the 4-dialkylaminopyridine is 4-dimethylaminopyridine.

4. The process of claim 1 wherein the temperature is in the range of 130° C. to 320° C.

* * * * *